3,188,219
FUSED REFRACTORY COMPOSITIONS
William A. Miller and Karl H. Sandmeyer, Jamestown, N.Y., assignors to Harbison-Carborundum Corporation, Falconer, N.Y., a corporation of Delaware
No Drawing. Filed Mar. 6, 1962, Ser. No. 177,736
6 Claims. (Cl. 106—59)

This invention relates to new and useful fused cast refractory products, and more particularly to fused cast refractory compositions of matter composed principally of the oxides of chromium, aluminum, iron and magnesium such as are obtained by a fusion of ingredients such as chromite ore, alumina and chromic oxide.

Commercial chromite ores have been known and used as a valuable refractory material, either alone or in conjunction with other constituents for many years. These commercial chromite ores range from those ores containing a relatively low amount of chromic oxide, finding principal use as a refractory material, to those high grade chromite ores of Turkish origin having a relatively high chromium oxide content, usually referred to as metallurgical ores because of their principal use in the metallurgical industry and as a source of green chromic oxide.

Chromite, or chrome spinel as it may be designated, which is the essential ingredient of chromite ores, is not a compound having a fixed chemical composition but is rather a member of the distinctive family of double oxides of iron and chromium whether or not combined with magnesia and alumina. These double oxide minerals all crystallize in the isometric system and in isomorphous combination. The family is usually designated chemically as

(Fe, Mg)O(Al, Fe, Cr)$_2$O$_3$ although the oxides of Fe and Cr predominate in respective groups. This is the material referred to as chromite or chrome spinel hereafter in this specification and in the appended claims. In chromite ores silica, generally in some combined form, is also always present. Chromite is probably the most useful chemically neutral refractory material known. However, on account of its associated impurities which cannot be readily separated by any known method of beneficiation, the desirable properties of chromite are somewhat minimized. In any case, it is highly desirable to choose chromite ores that are low in magnesia and silica. If a chromite ore containing too much magnesia is fused, the product tends to be basic; while the product of the fusion of an ore containing too much silica tends to be excessively acid (using the terms basic and acid in the conventional metallurgical sense). The ore which is selected for fusion, to be acceptable for purposes of the present inventions, should be one in which there is present at least one molecular equivalent of chromium oxide (Cr$_2$O$_3$) for each molecule of ferrous oxide (FeO) and in which the crystalline structure of the fused product has the R$_2$O$_3$ phase predominant over the spinel phase. Otherwise it is necessary to add sufficient alumina and/or chromium oxide to accomplish this result. It is to be noted that of the R$_2$O$_3$ oxides, Cr$_2$O$_3$ imparts the greatest resistance to corrosion, either individually or in solid solution in corundum. Its presence in the form of a spinel, although beneficial, does not result as effectively in increasing corrosion resistance.

It has been known for many years that fused cast refractory products made from fusions of chromite ore and alumina are resistant to corrosion by molten glass and other materials at high temperatures and therefore useful for many refractory purposes. U. S. Patents Nos. 2,063,154 and 2,279,260 describe in detail the manufacture of fused cast refractory products of this type and deal with the selection of raw materials so as to maintain the desired relationship between the minor oxidic constituents of particularly the chromite ore in order to obtain the desired crystalline character in the finished product. Although fused cast refractories made according to the teachings of U. S. Patents 2,063,154 and 2,279,260 met with some initial success as a refractory material, particularly for the lining of glass tanks where resistance to molten glass was essential, they have been largely superseded by other fused cast refractories, that, while not as highly resistant to corrosion by molten glass and other materials, avoided the use of chromite ore and its attendant disadvantages.

It is an object of the present invention to provide new and improved fused cast refractory compositions of matter embodying chromite ore and having improved resistance to corrosion.

We have discovered that fused cast refractories of improved properties, and especially exhibiting improved resistance to corrosion and erosion by molten glass at high temperatures, are obtained from fusions of chromite ore-containing mixes if the proportions of the chromic oxide, alumina, magnesia and iron oxide are such that those oxides are present in the proportions that the product of the mole ratio of chromic oxide to alumina and the mole ratio of R$_2$O$_3$ oxides to RO oxides is higher than 1.15, and preferably between 1.15 and 2.50. The attainment of the proper proportion of chromic oxide to alumina and proportion of R$_2$O$_3$ oxides to RO oxides is accomplished by the addition of appropriate amounts of alumina and/or chromic oxide to the chromite ore of the raw batch. Certain metallurgical grades of chromite ore are sometimes more economical to use because their use permits a reduction in the amount of chromium oxide as such required to be added to obtain the requisite molecular ratio.

We have further found that if the mole ratio of R$_2$O$_3$ oxides to RO oxides is maintained above 2.0 the resulting cast refractory product is still further improved, especially with respect to its resistance to breakage when subjected to severe thermal shock. The beneficial effect on the resistance to corrosion of maintaining the mole ratios of the oxide constituents within prescribed proportions in accordance with the teachings of the present invention is shown by the data set forth in Tables I, II, III and IV below.

Table I

| Composition No. | Raw batch constituents (percent by weight) | | | |
|---|---|---|---|---|
| | Alumina | Philippine chromite ore | Turkish chromite ore | Chromic oxide |
| 1 | 60 | 40 | | |
| 2 | 70 | 20 | | 10 |
| 3 | 60 | 30 | | 10 |
| 4 | 50 | 40 | | 10 |
| 5 | 60 | 20 | | 20 |
| 6 | 50 | 30 | | 20 |
| 7 | 40 | 40 | | 20 |
| 8 | | | 100 | |
| 9 | | 100 | | |
| 10 | 75 | 25 | | |

It will be noted from Table I that compositions Nos. 2, 3, 4, 5, 6 and 7 are three component batches consisting of mixtures in varying amounts of alumina, Philippine chromite ore and chromic oxide whereas compositions Nos. 8 and 9 represent fusions of two different straight chromite ores of widely different chemical composition. Compositions Nos. 1 and 10 are mixtures of alumina and Philippine chromite ore and are representative of the type of fused cast refractory composition made in accordance with the teachings of the above mentioned U. S. Patents 2,063,154 and 2,279,260. The chromic oxide as used in the above compositions of Table I is a pure material analyzing over 99% $Cr_2O_3$. Below is an analysis of an alumina which can be used in the compositions, although the alumina used is not necessarily restricted to the representative analysis shown.

| | | | |
|---|---|---|---|
| $Al_2O_3$ | 96.1 | CaO | 0.39 |
| $SiO_2$ | 0.88 | MgO | 0.15 |
| $Fe_2O_3$ | 0.65 | $TiO_2$ | 1.82 |

*Table II*

| Composition No. | Calculated chemical composition | | | | | | |
|---|---|---|---|---|---|---|---|
| | $Cr_2O_3$ | $Al_2O_3$ | MgO | FeO | $SiO_2$ | CaO | $TiO_2$ |
| 1 | 11.42 | 72.25 | 7.37 | 5.01 | 2.26 | 0.47 | 1.10 |
| 2 | 15.82 | 74.50 | 3.72 | 2.72 | 1.48 | 0.39 | 1.28 |
| 3 | 19.01 | 68.30 | 5.50 | 3.83 | 1.82 | 0.41 | 1.10 |
| 4 | 21.50 | 62.60 | 7.35 | 4.96 | 2.18 | 0.43 | 0.92 |
| 5 | 25.82 | 64.95 | 3.70 | 2.67 | 1.40 | 0.35 | 1.09 |
| 6 | 29.02 | 58.51 | 5.48 | 3.77 | 1.74 | 0.37 | 0.91 |
| 7 | 31.59 | 52.80 | 7.33 | 4.90 | 2.09 | 0.39 | 0.74 |
| 8 | 51.2 | 13.2 | 17.2 | 12.7 | 2.6 | | |
| 9 | 31.1 | 27.9 | 20.6 | 12.5 | 5.4 | 0.6 | |
| 10 | 7.5 | 80.8 | 4.6 | 3.6 | 1.8 | 0.45 | 1.33 |

Table II shows the calculated chemical composition of compositions 1 through 10 by oxide analysis, the percentages being given in percent by weight. It should be noted that compositions Nos. 5, 6 and 7 have a combined $Cr_2O_3$ and $Al_2O_3$ weight percent of from about 84 percent to about 94 percent of the composition, with the percent by weight of the $Cr_2O_3$ being from about 40 percent to about 60 percent by weight of the $Al_2O_3$. None of the other compositions have these combined composition characteristics.

*Table III*

| Composition No. | Mole percentages | | | | Mole ratios | | |
|---|---|---|---|---|---|---|---|
| | $Cr_2O_3$ | $Al_2O_3$ | MgO | FeO | $Cr_2O_3/Al_2O_3$ | $R_2O_3/RO$ | $Cr_2O_3/Al_2O_3 \times R_2O_3/RO$ |
| 1 | 0.075 | 0.709 | 0.183 | 0.070 | 0.106 | 3.1 | 0.328 |
| 2 | 0.104 | 0.731 | 0.092 | 0.038 | 0.142 | 6.4 | 0.910 |
| 3 | 0.125 | 0.669 | 0.136 | 0.053 | 0.187 | 4.2 | 0.785 |
| 4 | 0.142 | 0.613 | 0.182 | 0.069 | 0.232 | 3.0 | 0.695 |
| 5 | 0.170 | 0.637 | 0.092 | 0.037 | 0.267 | 6.3 | 1.682 |
| 6 | 0.191 | 0.573 | 0.136 | 0.052 | 0.333 | 4.1 | 1.365 |
| 7 | 0.208 | 0.516 | 0.182 | 0.068 | 0.403 | 2.9 | 1.170 |
| 8 | 0.337 | 0.129 | 0.426 | 0.177 | 2.61 | 0.77 | 2.010 |
| 9 | 0.205 | 0.273 | 0.511 | 0.174 | 0.750 | 0.7 | 0.525 |
| 10 | 0.049 | 0.791 | 0.114 | 0.050 | 0.062 | 5.1 | 0.316 |

Table III above presents the mole percentages of the chromic oxide, aluminum oxide, magnesium oxide and iron oxide, and also shows the mole ratios of chromium oxide to aluminum oxide, the $R_2O_3$ oxides to the RO oxides, and the product of the ratio in moles of chromic oxide to aluminum oxide and the ratio in moles of $R_2O_3$ oxides to RO oxides. It is observed that compositions numbers 5, 6, 7 and 8 have mole ratios of the four principal oxide constituents in accordance with the teachings of the present invention in that the product of the mole ratio of chromic oxide to alumina and the mole ratio of $R_2O_3$ oxides to RO oxides is in each of those compositions between 1.15 and 2.50. Compositions numbers 5, 6 and 7 are further in accord with the additional teachings to the effect that the ratio of $R_2O_3$ to RO oxides in the product is greater than 2. In contrast thereto, compositions 1 and 10 which are representative of the prior art, and other experimental compositions numbers 2, 3, 4, and 9 which are outside the scope of the present invention do not meet the requirements of the present teachings with respect to mole ratios.

*Table IV*

| Composition No. | $Cr_2O_3/Al_2O_3 \times R_2O_3/RO$ | Density | Glass corrosion | |
|---|---|---|---|---|
| | | | ML factor | Vol. factor |
| 1 | 0.328 | 3.56 | 35 | 22 |
| 2 | 0.910 | 3.76 | 20 | 14 |
| 3 | 0.785 | 3.71 | 22 | 11 |
| 4 | 0.695 | 3.65 | 22 | 11 |
| 5 | 1.682 | 3.83 | 14 | 6 |
| 6 | 1.365 | 3.70 | 16 | 12 |
| 7 | 1.170 | 3.73 | 14 | |
| 8 | 2.010 | 4.04 | 13 | 23 |
| 9 | 0.525 | 3.74 | 33 | 28 |
| 10 | 0.316 | 3.45 | 41 | |

Table IV above demonstrates the beneficial effect of maintaining the mole ratios of oxides within the prescribed teachings of the present invention upon the ability of the product to resist the corrosion of glass. Compositions 5, 6, 7 and 8 show a corrosion factor, indicating the extent of corrosion at the metal line when exposed to the corrosive and erosive effects of molten glass at high temperatures, of 13–16, whereas those compositions which do not respond to the teachings of the present invention and which are outside the scope of the present teachings, including those compositions representative of the prior art, show a much higher rate of corrosion when exposed to the effects of molten glass at high temperatures. The lower the corrosion factor, the more resistant to corrosion by molten glass. It is obvious from an examination of the data submitted in the above tables that the control of the mole ratios of the four principal oxides in chromite ore-containing fusions has a marked effect upon the corrosion resistance to be obtained with such compositions, and by following the teachings of the present invention, a marked enhancement of the resistance to corrosion is obtained.

In carrying out our invention we have found it satisfactory to use an electric furnace similar to that commonly used for the production of fused alumina for abrasive purposes, generally consisting of a water cooled iron shell without any lining other than that built up by the material being fused as it is fed into the furnace. Fusion is effected initially by the heat from an electric arc between two or more electrodes inserted in the iron shell; but after a bath of molten material is formed, the resistance of this material to the passage of electric current through it is used to supply heat. The material is gradually fed in, and the electrodes raised as the fused mass is built up.

We have found that when mixes of these compositions are properly fused, they are very fluid. The furnace may be adapted either for tapping the molten material out through its side, or it may be arranged to be tilted so as to pour the material into the mold. Particularly in the latter case, it is desirable that provision be made to prevent molten material spilling into the water cooling system. This may be accomplished by the use of an iron apron properly positioned.

The molten material is heated to a temperature considerably above its melting point, and is then poured into molds which can be of granular refractory material bonded with a core binder such as is commonly used in foundry practice, or can be made of slabs of preburned refractory, of carbon, or of a suitable metal, or can be water-cooled molds. On the other hand the molds can be preheated if desired, and can be insulated to prevent too rapid loss of heat, by embedding them in a molding flask in which they are surrounded by sand or other heat insulating material.

The molds should be provided with risers of ample size to permit complete filling of the mold without interference by material freezing in the headers. If the riser is made wedge shaped with its minimum section immediately adjoining the mold, removal of the excess material constituting a header is facilitated. After a mold is filled it is moved away and additional molds also filled successively.

Instead of pouring the molten refractory material into molds, it is also possible to utilize the furnace itself as a mold, in which case it is desirable to line it with a very light coating of refractory material so that the molten material may extend out to the edges to form a smooth block. Charging is carried on just as before, the electrodes being gradually withdrawn and a block built up to the desired thickness. This method of molding has the disadvantage that only one mold can be filled at a time, but this is compensated for by the fact that practically no material is lost in headers, etc. as in the other type of mold. It is sometimes desirable to provide furnace molds of this type with a small dimensional draft to facilitate removal of the piece from the mold although due to the considerable shrinkage after solidification this is in general unnecessary.

The molded pieces can be left in the mold for heat treatment; or, in the case of iron molds particularly, the pieces can be taken from the molds shortly after the outer walls of the casting have solidified and then annealed without other than their own support. The headers should be removed from the castings at this point by sledging, as the castings are tougher at this stage than when cold and there is less danger of their being cracked by the hammering. With a header tapering to a smaller sectional area next the casting, removal in this manner is usually simple and fairly clean.

For annealing we can utilize any of the customary annealing practices such as placing the molded pieces in a furnace and gradually reducing their temperature, covering the pieces with hot sand or other insulating material, or heavily insulating the pieces and allowing them to anneal by virtue of their own heat or by that of other blocks packed closely together with them.

The time-temperature curve required to secure given results naturally varies with the shape and size of the pieces and also with the exact composition of the material being cast. In general it may be said that if a given rate produces cracking it is obviously desirable to further retard the rate of cooling over some or all of the cooling range.

After the pieces are cold any objectionable remainder of the header or other minor protuberances can be removed by chipping, or in minor cases by grinding.

Having described the invention, it is desired to claim:

1. A fused cast composition composed principally of $Cr_2O_3$, $Al_2O_3$, MgO and FeO in which the combined $Cr_2O_3$ and $Al_2O_3$ constitutes from about 84 percent to about 90 percent by weight of the composition, the percent by weight of the $Cr_2O_3$ being from about 40 percent to about 60 percent of the percent by weight of the $Al_2O_3$, and the oxides being present in such proportions that the product of the mole ratio of $Cr_2O_3$ to $Al_2O_3$ and the mole ratio of $R_2O_3$ oxides to RO oxides is higher than 1.15 and the mole ratio of $R_2O_3$ oxides to RO oxides is greater than 2.0.

2. A fused cast composition composed principally of $Cr_2O_3$, $Al_2O_3$, MgO and FeO in which the combined $Cr_2O_3$ and $Al_2O_3$ constitutes from about 84 percent to about 90 percent by weight of the composition, the percent by weight of the $Cr_2O_3$ being from about 40 percent to about 60 percent of the percent by weight of the $Al_2O_3$, and the oxides being present in such proportions that the product of the mole ratio of $Cr_2O_3$ to $Al_2O_3$ and the mole ratio of $R_2O_3$ oxides to RO oxides is between 1.15 and 2.50 and the mole ratio of $R_2O_3$ oxides to RO oxides is greater than 2.0.

3. A fused cast composition composed principally of chromium oxide, alumina, magnesia and iron oxide, said oxides being present in approximately the following percentages by weight: chromium oxide about 26%, alumina about 65%, magnesia about 3.7% and iron oxide about 2.7%.

4. A fused cast composition composed principally of chromium oxide, alumina, magnesia and iron oxide, said oxides being present in approximately the following percentages by weight: chromium oxide about 29%, alumina about 59%, megnesia about 5.5% and iron oxide about 3.8%.

5. A fused cast composition composed principally of chromium oxide, alumina, magnesia and iron oxide, said oxides being present in approximately the following percentages by weight: chromium oxide about 32%, alumina about 53%, magnesia about 7.3% and iron oxide about 4.9%.

6. A fused cast composition composed principally of chromium oxide, alumina, magnesia and iron oxide, said oxides being present in approximately the following percentages by weight: chromium oxide about 26 to 32%, alumina 53 to 65%, magnesia 3.7 to 7.3%, and iron oxide 2.7 to 4.9%.

References Cited by the Examiner

UNITED STATES PATENTS

| 2,279,260 | 4/42 | Benner et al. | 106—59 |
| 2,408,305 | 9/46 | Field | 106—59 |

FOREIGN PATENTS

| 603,598 | 8/60 | Canada. | |

TOBIAS E. LEVOW, *Primary Examiner.*

JOHN H. MACK, *Examiner.*